United States Patent [19]

Chubb et al.

[11] 3,809,948

[45] May 7, 1974

[54] DISPLAY SYSTEMS

[75] Inventors: John Norman Chubb, Oxford; Ernest Kennedy Sinton, Wantage, both of England

[73] Assignee: United Kingdom Atomic Energy Authority, London, England

[22] Filed: May 31, 1972

[21] Appl. No.: 258,445

[30] Foreign Application Priority Data

June 10, 1971 Great Britain .................... 27365/71

[52] U.S. Cl. ......................... 315/27 GD, 340/324 A

[51] Int. Cl. ............................................ H01j 29/70

[58] Field of Search ......... 315/27 TD, 27 GD, 27 R, 315/24, 18, 19, 22; 340/324 A, 324 AD

[56] References Cited

UNITED STATES PATENTS

| | | | |
|---|---|---|---|
| 3,702,949 | 11/1972 | Kolb | 315/27 GD |
| 3,572,941 | 3/1971 | Kiss | 330/150 |
| 3,435,278 | 3/1969 | Carlock et al. | 315/27 GD |
| 3,479,552 | 11/1969 | Tomaszewski et al. | 315/18 |
| 3,453,604 | 7/1969 | Geusic et al. | 330/4.3 |

*Primary Examiner*—Maynard R. Wilbur
*Assistant Examiner*—J. M. Potenza
*Attorney, Agent, or Firm*—Larson, Taylor & Hinds

[57] ABSTRACT

A display system is disclosed, which is particularly suitable for character display on a cathode ray tube. Two analog signals are digitally generated and respectively and simultaneously applied to the X and Y deflection means of the tube. The magnitudes are progressively and linearly adjusted so that the beam spot moves over the screen along a predetermined raster of lines which is exactly predetermined and can be based on two accurately orthogonal axes. In this way, distortion due to the non-orthogonality of the $x$ and $y$ axes of the tube can be corrected for. The tube is associated with a data store which, for each character to be displayed, stores data indicative of the beam intensity at each point in the raster.

17 Claims, 6 Drawing Figures

DISPLAY SYSTEMS

BACKGROUND OF THE INVENTION

The invention relates to image display systems such as, for example, to cathode ray tube (CRT) display systems for displaying characters (which term includes alphanumeric characters and other patterns or images).

Display systems are known in which a beam of energy is directed onto a surface or screen across which the beam is swept and its intensity varied so as to produce the desired display. Such systems may be liable to distortion. One example of such a system is a cathode ray tube (CRT) display system in which the beam is a beam of electrons: such a display may be subject to "pin cushion" distortion and non-linearity, and the effect is that the $x$ and $y$ axes (along which the beam spot is respectively driven by the X and Y deflection means are not orthogonal at all points over the screen surface. A character display system in which the spot movement is merely controlled by X and Y coordinates will therefore preduce a distorted display.

It is an object of the invention to provide an improved image display system.

It is a further object of the invention to provide an improved cathode ray tube character display system.

It is another object of the invention to provide an improved display system in which correction is made for distortion effects.

It is yet a further object of the invention to provide an improved display system in which scanning time is reduced by adjusting the scan in dependence on the shape of each individual character to be displayed.

BRIEF SUMMARY OF THE INVENTION

According to the invention, there is provided an image display system, comprising means defining a surface, projection means for projecting a deflectable beam of energy onto the said surface for producing an image thereon in dependence on the beam intensity, first and second deflection means respectively energisable to deflect the beam in first and second transverse directions which are of substantially constant orientation over a particular portion of the surface, scan control means operative to energise the first and second deflection means simultaneously with such relative values of energisation that the point of scan is driven along a raster of lines on the surface whose orientation is predetermined and different from the first and second directions, and intensity control means for controlling the intensity of the beam as the point of scan moves along the raster, so as to produce a desired image pattern on the surface.

According to the invention, there is also provided an image display system, comprising means defining a surface, projection means for projecting a deflectable beam of energy onto the surface for producing an image thereon in dependence on the beam intensity, scan control means including beam deflection means and operative to scan the beam along a raster of lines on the surface whose orientation thereon is predetermined, storage means for storing, for each point on the lines, data indicative of a desired beam intensity at that point, the stored data indicative of the last point on each line (in the direction in which the line is scanned) which is to be of sensible intensity being specially coded, intensity control means operative to read the items of data as the point of scan moves along the raster and to produce intensity control signals of magnitude determined by the read items of data, means for feeding the intensity control signals to the projection means for controlling the beam intensity in dependence thereon, means for detecting the special code when the item of data indicative of the said last point on each line is read, and operative to produce a special signal in dependence thereon, and means for feeding the special signal to the scan control means to terminate the scan of each line and to initiate the scan of the next line.

BRIEF DESCRIPTION OF THE DRAWINGS

A CRT character display system embodying the invention will now be described, by way of example only, with reference to the accompanying drawings in which:

FIG. 3 is a block diagram of the system; and

DESCRIPTION OF PREFERRED EMBODIMENTS

The system to be described incorporates a CRT on which characters (which term includes alphanumeric characters and other visual patterns or images) are to be displayed by appropriately controlling the "bright-up" and "dim-down" of the CRT as the electron beam spot is moved over the screen. Such a system has many applications, but one particular application for the system is on photo-typesetting in which a number of characters to be typeset are displayed on the face of the CRT and then optically transferred on to film emulsion.

Figures 1, 2, 3:
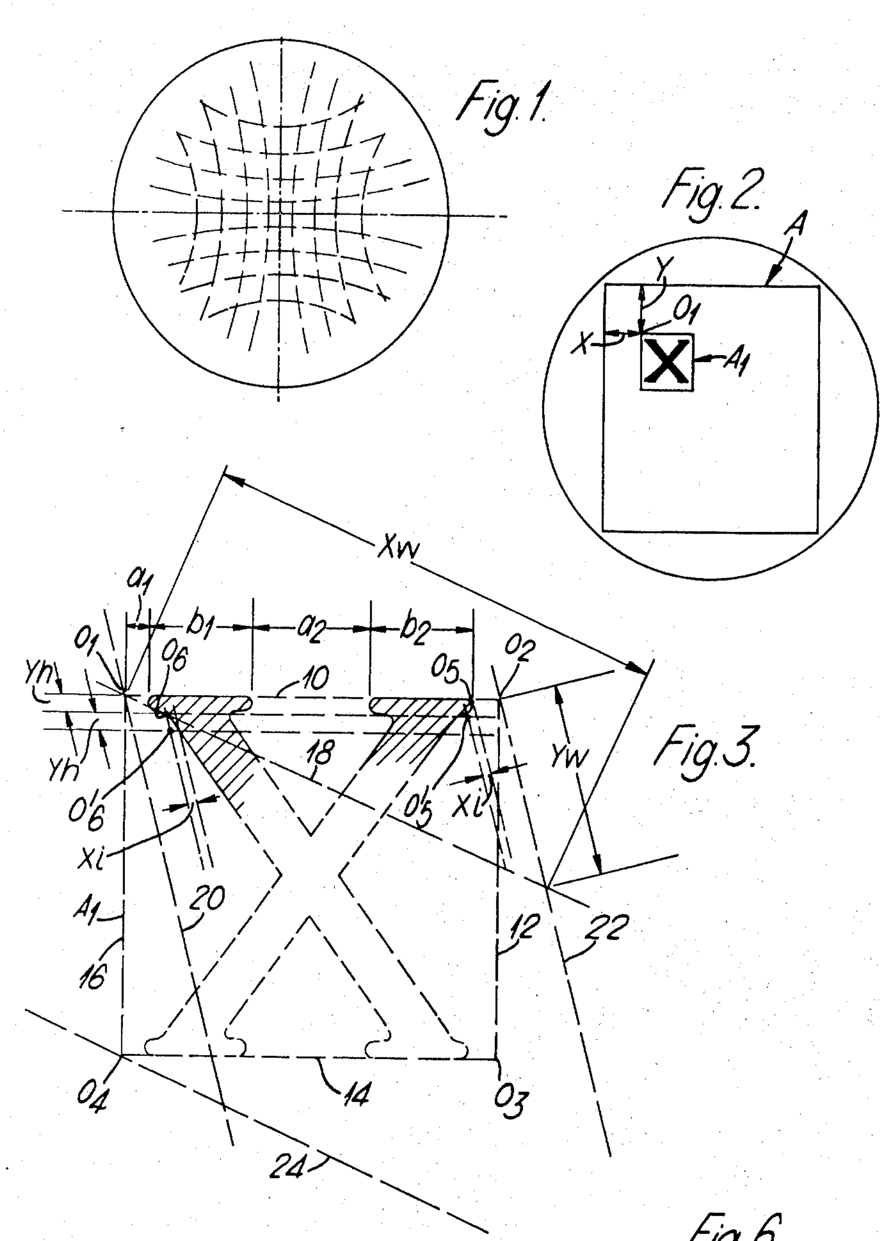
FIG. 1 is a diagrammatic front view of a CRT showing distortion effects.
FIG. 2 is a diagrammatic view of an orthogonal display area in which a character is to be displaced by means of the CRT.
FIG. 3 is an enlarged view of the portion of the face of the CRT for explaining the operation of the system.

FIG. 1 shows the front face of the CRT, and illustrates, by means of the chain dotted lines, the $x$ and $y$ axes along which the electron beam spot is caused to move by appropriate energisation of the X and Y deflection systems respectively. As is clearly shown in FIG. 1, the $x$ and $y$ axes are not othogonal but are subjected to the well known "pin cushion" distortion effect (this effect being exaggerated in the drawing). It will therefore be appreciated that a character displayed merely by causing "bright-up" at appropriate points defined by $x$ and $y$ coordinates of an orthogonal coordinate system will be distorted on the screen of the CRT if signal values directly corresponding to these $x$ and $y$ coordinates are used to control the X and Y deflection systems of the CRT. The system to be described employs digital techniques to correct for such distortion.

In explaining the operation of the system, it will be assumed that a character (the character X in this example) is to be displayed within a rectangular area $A_1$ (FIG. 2) which is itself positioned within a larger display area A, the position of the left hand top corner $O_1$ of the area $A_1$ being defined by $x$ and $y$ coordinates X and Y respectively.

FIG. 3 shows the area $A_1$ enlarged, this area being defined by four orthogonal boundary lines 10, 12, 14 and 16 and having four corners $O_1$, $O_2$, $O_3$ and $O_4$. FIG. 3 also shows the (distorted) $x$ and $y$ axes 18 and 20 passing through the corner $O_1$, and it will be apparent that, if a normal $x - y$ scan (that is, a scan in which the $x$ value were progressively increased for each of a succession of constant $y$ values) were performed starting from the corner $O_1$, the area scanned would be defined by the lines 18, 22, 24 and 20. In a manner to be described, the $x$ and $y$ parameters applied to the X and Y deflection systems in the CRT are continuously digitally adjusted so as to cause the spot to scan the rectangular area $A_1$ by means of a raster or horizontal lines, starting from the corner $O_1$, each of these horizontal lines being vertically spaced from the next by a predetermined distance. In order to control the display of the required character within the area $A_1$, the system includes storage means for storing, for each horizontal raster line, one or more data words indicating the incremental lengths along that line of the "bright-up" portions thereof. As the orthogonal raster scan of the area $A_1$ takes place, the system reads out these data words, and the CRT bright-up control is adjusted accordingly so as to produce the required display.

Figure 4:
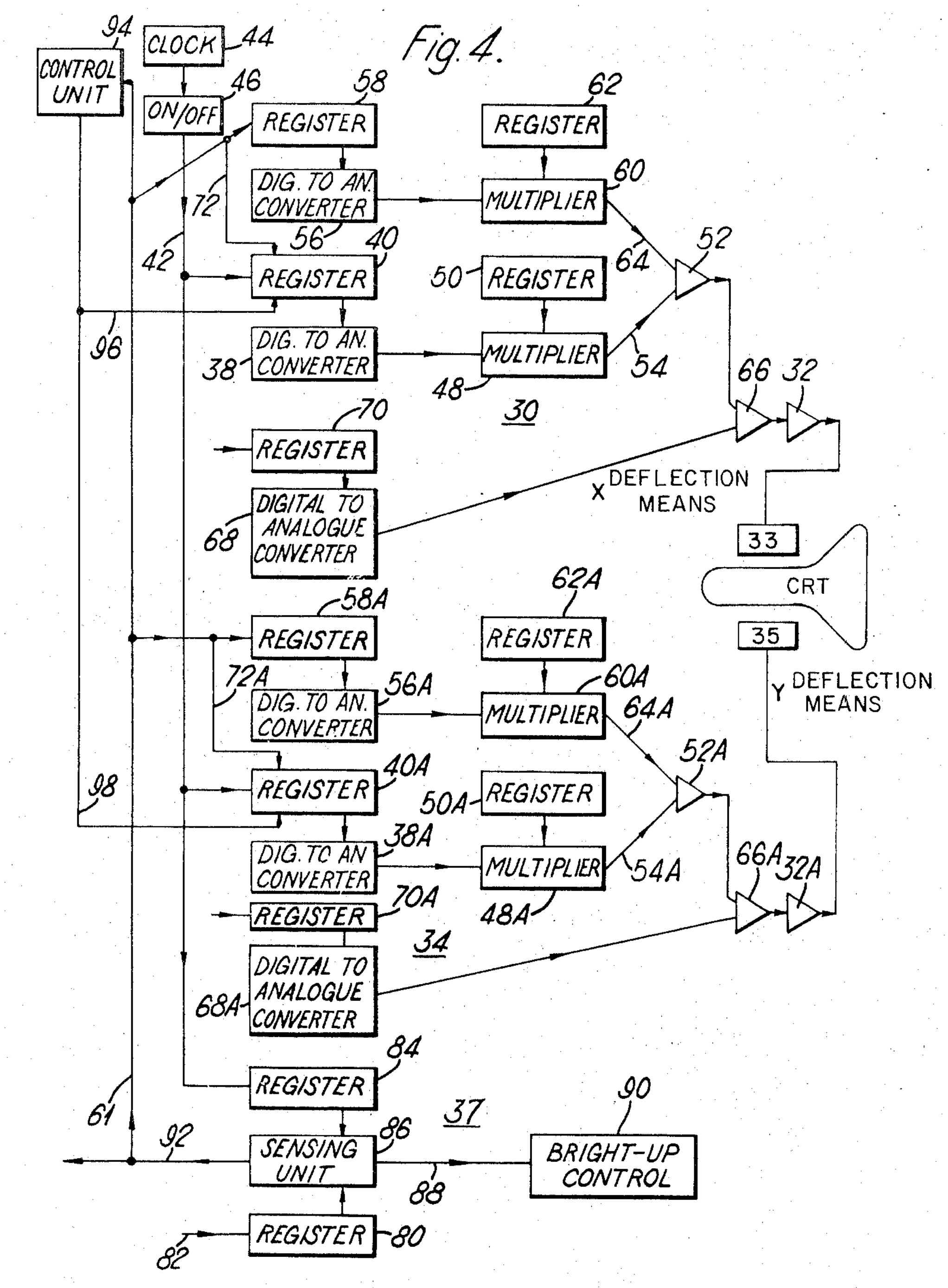

As shown in FIG. 4, the logic circuitry of the system comprises a section 30 which controls an X-scan amplifier 32 feeding the X deflection system 33 of the CRT, a section 34 which controls a Y-scan amplifier 32A feeding the Y deflection system 35 of the CRT, and a bright-up control section 37.

The section 30 comprises a digital to analogue converter 38 connected to be controlled by a counting register 40. The register 40 receives clock pulses on a line 42 from a clock generator 44 via an on/off contrll 46, and each clock pulse changes the analogue output of the digital to analogue converter 38 by an equal, predetermined increment.

The analogue output of the converter 38 is fed to a hybrid multiplier 48 whose second input is fed from a register 50 which digitally stores a number X$w$. The hybrid multiplier 48 multiplies the analogue input from the converter 38 by the number X$w$, and the resultant analogue product is fed to a summing amplifier 52 on a line 54.

The section 30 also includes a second digital to analogue converter 56 which is controlled by a register 58. The register 58 receives line shift pulses on a line 61 from the brightup control section 39. Each of these line shift pulses is produced on termination of a horizontal line of the raster in the manner to be explained and increases the analogue output of the digital to analogue converter 56 by an equal predetermined increment. The analogue output of the converter 56 is fed to a second hybrid multiplier 60 which is controlled by the register 62. The latter stores a digital number X$i$, and the hybrid multiplier 60 multiplies the analogue input from the converter 56 by the number X$i$, and the resultant analogue product is fed to the summing amplifier 52 on a line 64.

The summing amplifier 52 sums the two analogue inputs on the lines 54 and 64 and produces an analouge output which is fed to one input of a second summing amplifier 66. The second input of the amplifier 66 is fed from a digital to analogue converter 68. The latter is controlled by a register 70 into which a digital number representing the parameter X (the $x$ coordinate of the corner $O_1$ — FIG. 3) has been loaded before commencement of the raster scan.

The output of the amplifier 66 controls the X-scan amplifier 32.

The section 34 is generally similar to the section 30 and items in the section 34 corresponding to items in the section 30 are referenced similarly except for the addition of the distinguishing suffix A. In the section 34, the register 50A stores a digital number Y$w$, while the register 62A stores a digital number Y$h$. The register 70A receives a digital number representing the parameter Y (the $y$ coordinate of the corner $O_1$) before commencement of the raster scan.

The operation of the sections 30 and 34 will now be described with particular reference to FIG. 3.

Initially, the central processor unit controlling the system feeds the digital numbers representing the parameters X and Y into the registers 70 and 70A respectively, and the digital to analogue converters 68 and 68A therefore produce respective analogue outputs defining the $x$ and $y$ coordinates of the origin $O_1$ of the area $A_1$.

Initially, neither of the registers 40 and 58 is producing an output, and the summing amplifier 52 will thus receive no input. Therefore, the output of the amplifier 66 will depend solely on the parameter X fed into the register 70. Similarly, neither of the registers 40A and 58A is producing an output initially, and the output of the summing amplifier 66A will depend solely on the parameter Y fed into the register 70A. The CRT beam spot will thus be positioned at the corner $O_1$, but the brightness will be off.

Now, assuming that the on/off control 46 is switched ON, clock pulses are fed into the registers 40 and 40A at a frequency of, say, 10MHz.

The first such pulse applied to the register 40 causes the converter 38 to produce a small analogue output which is multiplied, in the hybrid multiplier 48, by the parameter X$w$. As shown in FIG. 3, the parameter X$w$ represents the distance, measured along the $x$ axis 18, between the two points thereon bisected by the $y$ axes 20 and 22 passing respectively through the corners $O_1$ and $O_2$. Thus, if the output of the digital to analogue converter 38 is considered to represent a fractional value, then the resultant increase in the output of the amplifier 66 (caused by the incremental product signal produced on the line 54) tends to move the electron beam spot along the axis 18.

However, the first clock pulse on the line 42 also causes the digital to analogue converter 38A to produce a small output which is multiplied by the parameter Y$w$ in the multiplier 48A and produces an incremental product signal on the line 54A. As shown in FIG. 3, the parameter Y$w$ represents the distance, along the $y$ axis 22, from its intersection with the $x$ axis 18 to the point $O_2$. Thus, if the output from the converter 38A is considered to represent a fractional value, then the total output from the amplifier 66A will tend to deflect the electron beam spot from the origin $O_1$ in an upward direction along the axis 20.

The incremental outputs of the converters 38 and 38A are arranged such that the total resultant deflection moves the electron beam spot horizontally.

The second clock pulse applied to the register 40 increases the analogue output of the converter 38 by the same amount as the first clock pulse and tends to move the beam spot further in a direction parallel to the axis 18. Similarly, this second clock pulse increases the output of the digital to analogue converter 38A by the same amount as the first clock pulse, and tends to move the beam spot in an upward direction parallel to the axis 20. The result is that the beam spot moves further along the first horizontal line of the raster, and this process continues as further clock pulses occur.

The first line pulse on the line 61 is fed by means of lines 72 and 72A to change the direction of counting of the registers 40 and 40a, so that subsequent clock pulses fed to these registers are subtracted from the contents. As will be explained below, the first line pulse occurs when the beam spot is at a position $O_5$ (FIG. 3). Tne line pulse also increments the register 58 so as to produce a small output from the digital to analogue converter 56. This is multiplied by the parameter Xi in the multiplier 60, and the resultant product on the line 64 is effectively subtracted from the signal on the line 54 in the amplifier 52. The effect is to cause the deflection system to tend to move the spot leftwards in the direction of the axis 18 by the distance X*i* which is shown in FIG. 3. At the same time, the line pulse on the line 61 causes the register 58A to produce a small analogue output from the converter 56A and this is multiplied by the number Y*h* in the multiplier 60A. The resultant signal on the line 64A is subtracted from the signal on the line 54A by the summing amplifier 52, and the effect is to tend to move the spot downwards in the direction of the *y* axis 20 by the distance Y*h* which is shown in FIG. 3. The numbers X*i* and Y*h* are selected so that the total resultant movement of the spot positions it at the point $O_5'$ vertically below $O_5$, where it is ready to commence the second horizontal line of the raster. This second horizontal line is scanned in the same manner as before, but in the reverse direction (due to the reversal of counting of the registers 40 and 40*a*), by means of the clock pulses applied on the line 42 to the registers 40 and 40A.

When the spot reaches a position $O_6$ (FIG. 3), a second line pulse occurs on line 61 and one more changes the direction of counting of the register 40 and 40*a*. This pulse also increments the registers 58 and 58A in the same way as described above, so that the spot is shifted by further increments X*i* and Y*h* and becomes positioned at a point $O_6'$ ready to commence the third scan (now in the rightwards direction).

In this way, it will be seen that the required successive horizontal scans of the rectangular area $A_1$ are carried out.

It will be seen that the above operation of the system assumes that the area $A_1$ is sufficiently small so that the portions of the *x* and *y* axes passing over it can be considered to be straight lines.

The bright-up section 37 comprises a register 80 capable of storing a group of words that describe the "bright-up" portions of the raster lines. Each group is received on a channel 82 from a store associated with the central processor unit (not shown) of a controlling computer: 16-bit words are assumed by way of example. The store stores one group of 16-bit words for each horizontal line of the area $A_1$. Each 16-bit word comprises two 7-bit numbers. One of these 7-bit numbers is coded to define a "bright-up" and the length thereof (measured along the horizontal), and the other is coded to define the adjacent "dim-down" and the incremental length thereof. Thus, for example, considering the first horizontal line of the raster in FIG. 3, the first 7-bit number corresponding thereto is indicative of the distance to a "bright-up" and represents the distance $a_1$. The next 7-bit number is indicative of the distance to a "dim-down" and represents a distance $a_2$. The second 16-bit word of the word group corresponding to the first line of the raster comprises a first 7-bit number indicative of the distance to a "bright-up" and representing the distance $b_1$ and a second 7-bit number indicative of the distance to a "dim-down" and representing It will be appreciated that the number of 16-bit words in each group (that is, the number of 16-bit words for each line of the raster) is not constant but depends on the form of the character and may, for example, be only one, two (as shown in FIG. 3) or more. One of the two remaining bits of the last 16-bit word defining a "bright-up" in each group is coded to indicate that it is the last for that raster line.

The bright-up section 37 (FIG. 4) includes a raster increment register 84 which is connected to receive clock pulses from the line 42, and its state at any instant is thus indicative of the horizontal distance of the beam spot from the left hand side 10 of the rectangular area $A_1$. Tne output of the register 84 controls a sensing unit 86 which sequentially inspects the stages of the register 80. The sensing unit 86 has an output line 88 which is connected to the CRT bright-up control 90, and a second output line 92 which is connected to the line 61 and either to the central processor unit or to the store so as to control the transfer of stored information.

In operation, it will be assumed that the group of 16-bit words corresponding to the first horizontal line of the raster has been fed into the register 80, the last of the 16-bit words in this group being indicated by the special coding bit mentioned above. As the beam spot scans along the first horizontal line, the register 84 will be incremented by the coock pulses and the sensing unit 86 will inspect the register 80 and determine, for each instantaneous beam spot position, whether the data in the register 80 calls for a bright-up or a dim-down. If a bright-up is called for, the sensing unit 86 energises the line 88 and activates the CRT bright-up control 90 accordingly. If a dim-down is called for, the control 90 is not activated.

When the sensing unit 86 detects the special coding bit in the register 80 indicative of the end of the group of 16-bit words, it activates the line 92 and generates a pulse on the line 61. In the manner explained above, this causes the sections 30 and 34 of the logic circuitry to end the current horizontal scan of the raster and to commence the next horizontal scan.

At the same time, the signal on the line 92 causes the store to feed into the register 80 the group of 16-bit words containing the bright-up and dime-down data for this second horizontal scan line. This feeding-in process is facilitated by the special coding bits indicating the last 16-bit word of each group. Thus, the 16-bit words can be serially stored in the computer store, and transferred serially into the register 80 until the next special coding bit is read, whereupon the feeding process is terminated. Completion of a full raster scan (for example, on completion of a character) may be indicated by, for example, finding a clear field in the store.

Figure 5:
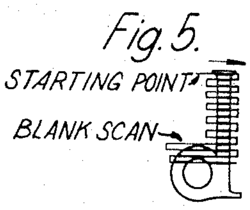
FIGS. 5 and 6 show different ways of scanning a character.
Figure 6:
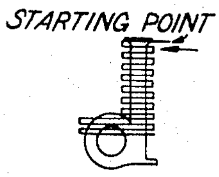

It will also be observed that the special coding bits provide a useful saving in scanning time since each horizontal scan does not have to be continued all the way to the line 12 (FIG. 3) or back to the line 16 but is terminated as soon as the last 16-bit word containing bright-up data is read from the register 80. This enables the length of the scan line to adjust automatically to the minimum required at each part of the character, and this will give a particularly useful saving in scanning time for characters having ascenders and descenders for example. To ensure that other portions of the character body may be brought into the scan at the current scan line, it is possible to start the first scan line in either a left hand or a right hand direction, or to complete the preceding line with a blank scan as far out as needed. This is illustrated in FIGS. 5 and 6.

To enable blank spaces to be spanned which are larger than directly compatible with 7-bit accuracy, the sixteenth bit of each 16-bit word can be used to indicate whether bright-up is to be permitted or not.

The distortion correction provided by the system described can only be fully effective over limited portions of the total area A (FIG. 2) at a time (since it depends on the assumption that the *x* and *y* axes are linear). Therefore, if very large characters are to be displayed, taking up a larger portion of the total area A, it may be advantageous to build up the display from a number of sub-characters.

Although the system has been described as being advantageous for photo-typesetting, it is by no means limited to this application but can be used for other applications where distortion-corrected displays are required. Thus, for example, another application of the system is in X-Y plotting. A further application is in the production of half-tone photographs. In this application, the beam spot would display different parts of the picture as it carries out the orthogonal raster scan of the area $A_1$. The bright-up data would not, however, merely indicate a "bright-up" or "dim-down" but would generate a character with the appropriate average "greyness" (in a scale from 1 to 32, for example) required at that point.

Although the system described has been shown as correcting distortion to provide an orthogonal raster, it will be appreciated that any other required shape of raster may be provided by adjusting the operating parameters of the sections 30 and 34 of the system. Thus, in some applications an oblique raster may be required.

In the system described, the raster scanning mode is bidirectional. This is advantageous because it avoids the waste of the flyback time and allows shortened scan lines to be used for characters with ascenders and descenders. However, a uni-directional raster scan may be provided instead if desired. Thus, the control unit 94 may be connected to be activated by each signal on the line 61 so as to clear the contents of the registers 40 and 40A by means of lines 96 and 98. In this way, the registers 40 and 40A are cleared and the spot is caused to fly back to the left hand margin of the character raster. The next following clock pulses cause the registers 40 and 40A to count up again so as to increment the analogue outputs of the converters 38 and 38A: therefore, the beam spot carries out the second horizontal scan again from left to right.

The selection control unit 94 may be controlled by appropriate control words stored for each character to be displayed. These control words can indicate whether the raster scan is to be uni-directional with fly-back, or bi-directional. In addition, it will be appreciated that the system may be modified either constructionally, or operationally under control of the selection unit 94 which may be set by the controlling computer, so as to carry out vertical instead of horizontal scanning of the area $A_1$. Furthermore, the system can be arranged to display the mirror image of each character if required by starting the direction of the first raster line in the reverse direction and changing the direction of the increments between lines.

The system may include means for storing information for correcting the focussing and astigmatism of the beam as it carries out its scan. Thus, as the scan progresses, this information can be read out and used to ensure that the focussing and astigmatism are maintained within prescribed limits throughout the scan.

Although the system has been described with particular reference to cathode ray tube displays, it will be appreciated that it can of course be applied to other forms of display such as, for example, laser display systems (including such systems where the laser beam performs a material cutting operation which follows the shape of the display): such laser display systems may involve movable mirrors for carrying out the deflection in the same way as described above for the CRT deflection arrangements, or may involve direct digital control of the scanning movement of the laser beam.

What is claimed is:

1. An image display system, comprising projection means for projecting a deflectable beam of energy on to a surface for producing an image thereon in dependence on the beam intensity, first and second analog deflection means respectively energisable by predetermined first and second electrical analog signals to deflect the beam in first and second transverse directions which are of substantially constant orientation over a particular portion of the surface, digital correction means including correction data storage means for digitally storing data indicative of corrections to be applied to the first and second analog signals to cause the deflection means to drive the point of scan along a raster of lines on the surface whose orientation is predetermined and diferent from the first and second directions, digitally controlled scan control means operative to generate the first and second analog signals for application to the first and second deflection means respectively and including means operative to feed each analog signal to the correction means to subject each signal, before the signal is applied to the respective deflection means, to direct multiplication by the value of the corresponding digital correction data read out from the storage means, means operative to energise the first and second deflection means simultaneously with the corrected first and second analog signals to drive the point of scan along the said raster of lines, and intensity control means for controlling the intensity of the beam as the point of scan moves along the raster, so as to produce a desired image pattern on the surface.

2. A system according to claim 1, in which the intensity control means comprises storage means for storing, for each point on the lines, data indicative of a desired beam intensity at that point, and means operative to read the data as the point of scan moves along the raster and to control the intensity of the beam accordingly.

3. A system according to claim 1, in which the first and second analog signals generated by the scan control means are progressively changing when applied to the first and second deflection means respectively, the signals changing at such rates as to produce the desired raster.

4. A system according to claim 3, in which the scan control means includes means responsive to the end of each line of the raster to produce a predetermined step change in each said analog signal of such magnitude as to bring the point of scan to the beginning of the next line of the raster.

5. A system according to claim 1, in which the projection means comprises the cathode gun of a cathode ray tube whereby the said beam is a beam of electrons in the cathode ray tube, and the said surface comprises the screen of the cathode ray tube.

6. A system according to claim 5, in which the first and second deflection means respectively comprise the X deflection means and the Y deflection means of the cathode ray tube which are respectively electrically energisable to drive the electron beam spot in $x$ and $y$ directions over the tube screen, the said directions being of substantially constant and relatively transverse orientation over the said particular portion of the screen, and the scan control means is operative to energise the X and Y deflection means simultaneously with said analog signals of such relative value that the said raster of lines on the screen along which the beam spot is driven have an orientation which is predetermined and different from the $x$ and $y$ directions.

7. In a cathode ray tube image display system comprising a cathode ray tube having a cathode gun for projecting a deflectable beam of electrons onto the cathode ray tube screen for producing an image thereon in dependence on the beam intensity, and X and Y deflection means respectively energisable by predetermined first and second electrical analog signals to deflect the beam in $x$ and $y$ transverse directions over the tube screen which are of substantially constant and relatively transverse orientation over a particular portion of the screen, digital correction means including correction data storage means for digitally storing data indicative of corrections to be applied to the first and second analog signals to cause the deflection means to drive the point of scan along a raster of lines on the screen whose orientation is predetermined and different from the $x$ and $y$ directions, first means for generating the said first electrical analog signals, second means for generating the said second electrical analog signals, a source of clock pulses connected to feed clock pulses to digitally drive the first and second means, each of the first and second means including first analog means responsive to the clock pulses to generate respective said electrical analog signals which change progressively in predetermined increments, and means for feeding the respective analog signals from the analog means to the ditital correction means, before each analog signal is applied to the respective deflection means, to subject each signal to a correction determined by corresponding digital correction data read out from the storage means, means operative to energise the X and Y deflection means simultaneously with the corrected first and second analog signals to drive the point of scan along the said raster of lines, and intensity control means for controlling the intensity of the beam as the point of scan moves along the raster, so as to produce a desired image pattern on the screen.

8. A system according to claim 7, including means responsive to the completion of each line of the said raster to produce a respective electrical line pulse, and in which each of the first and second means also includes second analog means digitally driven by each said line pulse to generate respective said electrical analog signals which change progressively in predetermined increments in response to the said line pulses, and means for feeding the electrical analog signals from the second analog means to the digital correction means to subject them to the said corrections, the said means for feeding the analog signals to the deflection means comprising, for each of the deflection means, respective algebraic adding means for algebraically adding each said analog signal generated by the second analog means and corrected by the correction means to the analog signals corresponding to the same line of the raster and generated by the first analog means and corrected by the correction means, whereby to produce a resultant said analog signal being the algebraic total of the two analog signals added, and means for feeding the said resultant analog signal to energise the respective deflection means, the incremental changes in the analog signals generated by the second analog means and the corrections applied thereto by the correction means being such that one end of each line of the raster lies on a predetermined, transverse, base line, and the lines of the raster are separated by a predetermined distance.

9. A system according to claim 8, in which each said analog means comprises a register responsive to the said pulses and operative to produce a progressively changing electrical digital signal, and a digital-to-analog converter response to the digital signal to produce a correspondingly changing electrical analog signal, and the said digital correction means comprises storage means for storing fixed correction signals, and multiplying means for multiplying the fixed signals with the respective electrical analog signals whereby to correct the value of the respective said analog signal.

10. A system according to claim 8, in which each of the first and second means includes means for generating a respective further said electrical analog signal representing a respective $x$ and $y$ coordinate of the initial point of the first line of the raster, and each said algebraic adding means includes means for adding the respective further analog signal to the other analog signals to produce the said resultant analog signal.

11. A system according to claim 7, in which the beam intensity control means comprises intensity control storage means for storing a respective group of items of data for each line of the raster, the successive items of data of each group respectively defining the lengths of the successive portions of spot movement over which the beam intensity is to be constant at a predetermined level, means responsive to the said clock pulses and operative to read from the said intensity control storage means the data corresponding to each point on the lines of the raster in synchronism with the movement of the spot along the lines of the raster, whereby to produce an intensity control signal whose value depends on the beam intensity indicated by the said data, and means for feeding the intensity control signal to the electron gun to control the beam intensity.

12. A system according to claim 8, in which the beam intensity control means comprises intensity control storage means for storing a respective group of items of data for each line of the raster, the sucessive data items of each group respectively defining the lengths of the successive portions of spot movement over which the beam intensity is to be constant at a predetermined level, and the item of data respresenting the last said portion of each line of the raster (in the direction in which the spot moves therealong) which is to be of relatively high intensity being specially coded, means responsive to the said clock pulses to read out from the intensity control storage means the data corresponding to each point on the lines of the raster as the spot moves therealong whereby to produce an intensity control signal whose value depends on the beam intensity indicated by the read data, and means for feeding each intensity control signal to the electron gun for controlling the beam intensity in dependence thereon;

and in which the said means for producing the line pulses comprises means for detecting each said specially coded item of data and producing a respective said line pulse in response thereto.

13. A system according to claim 1, in which the projection means comprises a laser beam source.

14. An image display system, comprising projection means for projecting a deflectable beam of energy onto a surface for producing an image thereon in dependence on the beam intensity, digitally controlled scan control means including beam deflection means and operative to scan the beam along a raster of lines on the surface whose orientation thereon is predetermined by stored digital data, intensity control storage means for storing, for each point on the lines, digital data indicative of a desired beam intensity at that point, the stored data indicative of the last point on each line (in the direction in which the line is scanned) which is to be of sensible intensity being specially coded, intensity control means operative to read out from the intensity control storage means the items of data as the point of scan moves along the raster and to produce intensity control signals of magnitude determined by the read-out items of data, means for feeding the said intensity control signals to the projection means for controlling the beam intensity in dependence thereon, means for detecting the special code when the item of data indicative of the last point on each line is read out, and operative to produce a special signal in dependence thereon, and means for feeding the special signal to the scan control means to terminate the scan of each line and to initiate the scan of the next line.

15. A system according to claim 14, in which the beam deflection means comprises first and second deflection means for respectively deflecting the beam in first and second transverse directions in dependence on respective energisation signals, and means for digitally generating respective progressively changing energisation signals and feeding them to the first and second deflection means simultaneously, the signals changing linearly and at such rates as to produce the desired raster.

16. A system according to claim 14, in which the said projection means comprises the electron gun of a cathode ray tube, the said surface comprises the screen of the cathode ray tube, and the first and second deflection means are the X and Y deflection means respectively of the cathode ray tube.

17. A system according to claim 14, in which the projection means comprises a laser beam source.

* * * * *